(12) United States Patent
Hong et al.

(10) Patent No.: US 12,393,870 B2
(45) Date of Patent: Aug. 19, 2025

(54) DATA GENERATION APPARATUS AND METHOD THEREOF

(71) Applicant: KOREA ADVANCED INSTITUTE OF SCIENCE AND TECHNOLOGY, Daejeon (KR)

(72) Inventors: Seung Bum Hong, Daejeon (KR); Chi Hao Liow, Daejeon (KR); Young Woo Choi, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 951 days.

(21) Appl. No.: 17/508,167

(22) Filed: Oct. 22, 2021

(65) Prior Publication Data
US 2022/0188703 A1 Jun. 16, 2022

(30) Foreign Application Priority Data
Dec. 10, 2020 (KR) .......................... 10-2020-0172677

(51) Int. Cl.
*G06N 20/00* (2019.01)
(52) U.S. Cl.
CPC .................................... *G06N 20/00* (2019.01)
(58) Field of Classification Search
CPC ....................................................... G06N 20/00
USPC ............................................................ 706/12
See application file for complete search history.

(56) References Cited

U.S. PATENT DOCUMENTS

| | | | |
|---|---|---|---|
| 11,392,621 B1* | 7/2022 | Jaffrey | ................ G06F 16/2246 |
| 2006/0041416 A1* | 2/2006 | Shah | ....................... G06F 30/33 |
| | | | 703/14 |
| 2011/0153529 A1* | 6/2011 | Bracy | ..................... G06F 30/33 |
| | | | 706/54 |

(Continued)

FOREIGN PATENT DOCUMENTS

| | | |
|---|---|---|
| KR | 2020-0044189 A | 4/2020 |
| KR | 2020-0075940 A | 6/2020 |

OTHER PUBLICATIONS

How, When, and Why Should YouNormalize / Standardize / Rescale YourData?, https://towardsai.net/p/data-science/how-when-and-why-should-you-normalize-standardize-rescale-your-data-3f083def38ff, as archived Nov. 2, 2020 (Year: 2020).*

*Primary Examiner* — Austin Hicks
(74) *Attorney, Agent, or Firm* — Bridgeway IP Law Group, PLLC; Jihun Kim

(57) ABSTRACT

A data generation apparatus includes a data input unit that inputs an initial dataset, a data preprocessing unit that normalizes the initial dataset and splits the normalized initial dataset into a initial training dataset and a initial test dataset, a learning model generation unit that trains a first machine learning model using the initial training dataset and optimizes a hyperparameter of the first machine learning model using a predetermined number of cross-validations, thereby generating a first learning model, a validation unit that validates the generated first learning model using the initial test dataset, a semi-synthetic data generation unit that selects and generates a new parameter within a boundary space defined by the initial dataset and performs data prediction using the first learning model based on the new parameter to generate a semi-synthetized dataset, and a database that stores the initial dataset and the semi-synthetized dataset.

15 Claims, 8 Drawing Sheets

(56) References Cited

U.S. PATENT DOCUMENTS

| | | |
|---|---|---|
| 2019/0196892 A1 | 6/2019 | Matei et al. |
| 2020/0320351 A1 | 10/2020 | Nikolenko et al. |
| 2020/0320371 A1 | 10/2020 | Baker |
| 2021/0312064 A1* | 10/2021 | Arthur ................ G06F 21/6254 |

* cited by examiner

DATA GENERATION APPARATUS AND METHOD THEREOF

BACKGROUND OF THE INVENTION

Field of the Invention

The present invention relates to a data generation apparatus and a data generation method, and more specifically relates to a semi-synthetic data generation apparatus and a data generation method for data augmentation used for machine learning.

Description of the Related Art

Recently, research on using machine learning systems in various fields, such as vision or speech recognition, video or speech synthesis, chatbots, information analysis and prediction, autonomous driving, and robots, has been actively conducted, and machine learning systems previously showing remarkable performance in many fields which aims in replacing humans. However, there are many limitations to the application of machine learning systems in fields lacking existing training data. The accuracy of analysis and prediction by a machine learning system is greatly affected by the amount of data learned by the system, because the amount of training data will directly influence problems such as overfitting or underfitting. When the amount of training data that can be learned is sufficient, the machine learning system can perform high accuracy and the targeted function appropriately. However, in fields where the amount of existing relevant data that can be learned is insufficient, the performance of the machine learning system does not meet expectations and shows low reliability due to epistemic uncertainty.

In order to solve such a problem, various data augmentation methods have recently been developed to generate sufficient data to be used for training mainly in the field of vision recognition and/or synthesis. However, for data augmentation methods that can be used in various fields other than vision recognition, such as language fields or analysis/prediction fields, a method showing remarkable performance has not yet been developed.

Another problem is that the accuracy of machine learning systems can be affected not only by the amount of training data, but also by tainted data or impure data contained within the training data. As such, impure data or tainted data adds bias or uncertainty of data to the machine learning system. Therefore, how much of the impure data or tainted data or how the impure data or tainted data can be excluded from the training data is also an important factor in improving the accuracy of the machine learning system.

Finally, for application to each field, a processing speed, that is, a response time, is significantly important for the practicability of the machine learning system. For example, a Recurrent Neural Network (RNN) system has a disadvantage in that a training time is relatively slow, and thus there is a limit in the field of application.

SUMMARY OF THE INVENTION

The present invention has been proposed to solve the above problems, and an object of the present invention is to provide a data generation apparatus or method capable of generating a large amount of reliable, that is, valid data through a relatively simple and fast process in augmenting data to ensure sufficient training data so that a machine learning system having high accuracy is generated.

In addition, an object of the present invention is to provide a data generation apparatus or method capable of excluding impure data or tainted data with faster speed and higher reliability when synthetizing data.

In addition, an object of the present invention is to provide a highly flexible data generation apparatus or method capable of providing appropriate data augmentation to improve performance of a machine learning model in various fields other than vision recognition.

To achieve the above objects, a data generation apparatus according to an embodiment of the present invention may include a data input unit that inputs a first dataset, a data preprocessing unit that normalizes the first dataset, and splits the normalized first dataset into a first training dataset and a first test dataset, a learning model generation unit that trains a first machine learning model using the first training dataset, and optimizes a hyperparameter of the first machine learning model using a predetermined number of cross-validations, thereby generating a first learning model, a validation unit that validates the generated first learning model using the first test dataset, a semi-synthetic data generation unit that selects and generates a new parameter within a boundary space defined by the first dataset, and performs data prediction using the first learning model based on the new parameter to generate a semi-synthetized dataset, and a database that stores the first dataset and the semi-synthetized dataset.

The data preprocessing unit may combine the semi-synthetized dataset with the input dataset to predict a new dataset.

The learning model generation unit may train a second machine learning model using the original training dataset and optimize the hyperparameters of the second machine learning model using a predetermined number of cross-validations, thereby further generating a second learning model.

The validation unit may validate the second learning machine model using the second test dataset to determine whether a validation accuracy of the second learning model is higher than a predetermined validation accuracy threshold value, thereby determining a fitness of the new parameter.

When the new predicted database is determined to be fit, the semi-synthetic data generation unit may identify the semi-synthetized dataset as a valid dataset and store the new dataset in the original database, and when the new parameter is determined to be unfit, the semi-synthetic data generation unit may discard the semi-synthetized dataset.

The semi-synthetic data generation unit may generate a new parameter using a floating point or integer random number generator to generate a parameter within a predefined space.

The semi-synthetic data generation unit may select and generate a new parameter calculated based on a boundary condition of a boundary space defined by the first dataset when the new parameter is selected.

The first machine learning model may use a support vector machine (SVM) or an XGboost (XGB). The second machine learning model should not be the same as the first machine learning model.

A data generation apparatus according to another embodiment of the present invention may include
- a data input unit that inputs a first dataset,
- a data preprocessing unit that normalizes the initial dataset, and splits the normalized initial dataset into an initial training dataset and a first test dataset,
- a learning model generation unit that generates a first learning model by training a first machine learning model using the initial training dataset and optimizing the first machine learning,
- a validation unit that validates the generated first learning model using the initial test dataset,
- a semi-synthetic data generation unit that selects and generates a new parameter within a boundary space defined by the initial dataset, and performs data prediction using the first learning model based on the new parameter to generate a semi-synthetized dataset,
- a semi-synthetic data filter unit that determines a fitness of the new parameter based on a second dataset generated by combining the semi-synthetized dataset and the initial dataset and the first machine learning model, and determines that the semi-synthetized dataset is accepted as valid data or discarded according to the fitness, and
- a database that stores the initial dataset and the semi-synthetized dataset.

A data generation method performed by a data generation apparatus according to another embodiment of the present invention may include
- a step of inputting a initial dataset,
- a step of normalizing the initial dataset, and splitting the normalized initial dataset into a initial training dataset and a initial test dataset,
- a step of training a first machine learning model using the initial training dataset, and optimizing a hyperparameter of the first machine learning model using a predetermined number of cross-validations, thereby generating a first learning model,
- a step of validating the first learning model using the initial test dataset,
- a step of selecting and generating a new parameter from within a boundary space defined by the initial dataset, and
- a step of performing data prediction based on the new parameter using the first learning model to generate a semi-synthetized dataset.

The data generation method may further include a step of combining the semi-synthetized dataset with the initial dataset to form a augmented (also known as second dataset) dataset.

The data generation method may further include a step of splitting the second dataset into a second training dataset and a second test dataset, and a step of training a second machine learning model using the second training dataset and optimizing a hyperparameter of the second machine learning model using a predetermined number of cross-validations, thereby generating a second learning model.

The data generation method may further include a step of validating the second learning machine model using the second test dataset to determine whether a validation accuracy of the second learning model is higher than a predetermined validation accuracy threshold value, thereby determining a fitness of the new parameter.

The data generation method may further include a step of identifying the semi-synthetized dataset as a valid dataset and storing the second dataset in a database when the new parameter is determined to be fit, and discarding the semi-synthetized dataset when the new parameter is determined to be unfit.

In the data generation method, the step of selecting and generating the new parameter may include generating a new parameter using a floating point or integer random number generator to generate a parameter not allowed to be acquired from the first dataset.

In the data generation method, the step of selecting and generating the new parameter may include selecting and generating a new parameter calculated based on a boundary condition of a boundary space defined by the initial dataset.

The first machine learning model may use a support vector machine (SVM) or an XGboost (XGB). The second machine learning model may not be the same as the first machine learning model.

The data generation method may further include a step of filtering the semi-synthetized dataset by determining a fitness of the new parameter based on the second dataset and the first machine learning model,
in which the step of filtering the semi-synthetized dataset may include
identifying the semi-synthetized dataset as a valid dataset and storing the semi-synthetized dataset in the database when the new parameter is determined to be fit, and
discarding the semi-synthetized dataset when the new parameter is determined to be unfit.

DETAILED DESCRIPTION OF THE PREFERRED EMBODIMENTS

Figure 1:
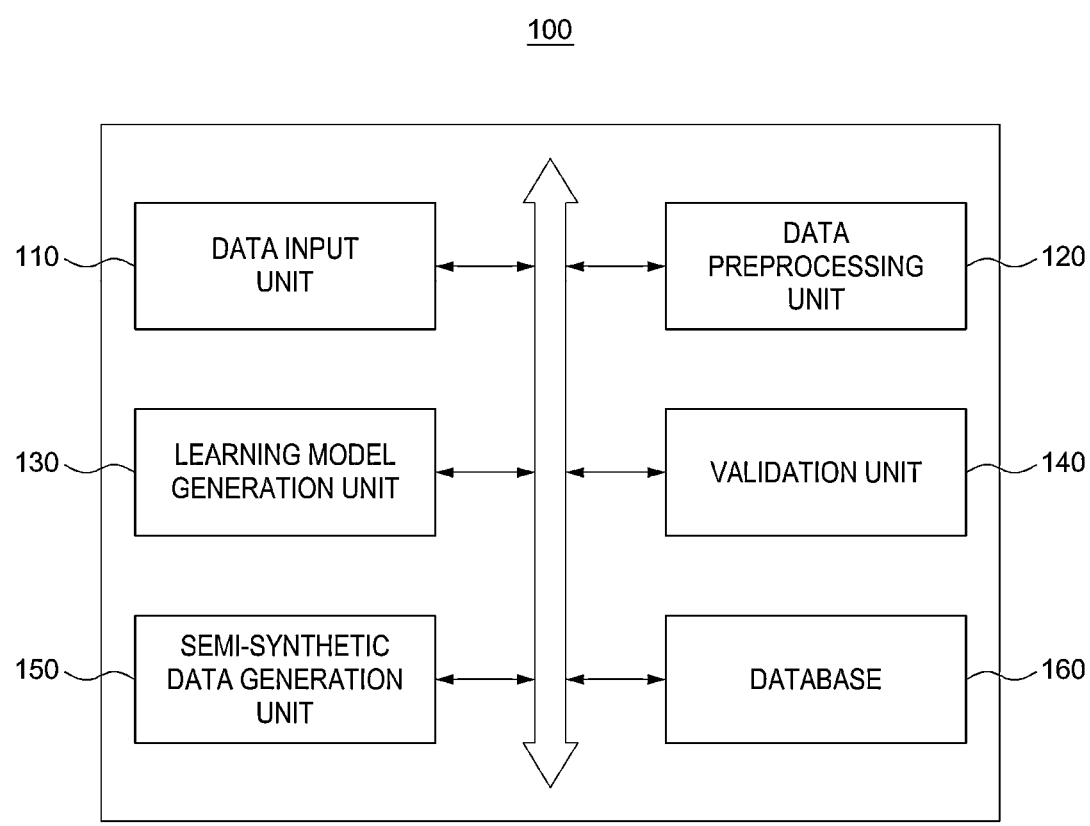
FIG. 1 is a block diagram illustrating a schematic configuration of a semi-synthetic data generation apparatus according to an embodiment of the present invention.

Hereinafter, the present invention will be described with reference to the accompanying drawings. However, the present invention may be embodied in several different forms, and thus is not limited to the embodiments described herein. Further, in order to clearly describe the present invention in the drawings, parts irrelevant to the description are omitted, and similar reference symbols are attached to similar parts throughout the specification.

Throughout the specification, when a part is described to be "linked (connected, in contact, or coupled)" with another part, this description includes not only the case of being "directly linked" but also the case of "indirectly linked" with another member interposed therebetween. In addition, when a part is described to "include" a certain component, this description means that other components may be further included, rather than excluding other components, unless otherwise stated.

The terminology used herein is used merely to describe specific embodiments, and is not intended to limit the present invention. The singular expression includes the plural expression unless the context clearly dictates otherwise. In the present specification, it should be understood that a term such as "include" or "have" is intended to designate that a feature, number, step, operation, component, part, or a combination thereof described in the specification is present, and the term does not preclude a possibility of presence or addition of one or more other features, numbers, steps, operations, components, parts, or combinations thereof.

Hereinafter, preferred embodiments are presented to help the understanding of the present invention. However, these are merely illustrative of the present invention, and it is apparent to those skilled in the art that various changes and modifications are possible within the scope and spirit of the present invention. Further, it goes without saying that such changes and modifications fall within the scope of the appended claims.

Hereinafter, the present invention will be described in more detail with reference to the accompanying drawings illustrating embodiments of the present invention.

The present invention provides a semi-synthetic data generation apparatus and method capable of augmenting a large amount of reliable data that can be used for training more conveniently so that a machine learning system can be applied with high accuracy even in fields where it is difficult to properly utilize a machine learning algorithm since the absolute amount of the existing pool of data or cases is small. Here, "semi-synthetic data" means data generated based on previously provided training data in the corresponding field, rather than completely newly generated data.

FIG. 1 is a block diagram illustrating a schematic configuration of a semi-synthetic data generation apparatus 100 according to an embodiment of the present invention.

Referring to FIG. 1, the data generation apparatus 100 according to an embodiment of the present invention may include a data input unit 110, a data preprocessing unit 120, a learning model generation unit 130, a validation unit 140, a semi-synthetic data generation unit 150, and a database 160. The data generation apparatus 100 according to another embodiment of the present invention may further include a separate semi-synthetic data filter unit (not illustrated).

The data input unit 110 may receive an initial dataset and input the dataset to the data generation apparatus 100. The initial dataset may be an existing empirical, arithmetic, or statistical dataset in relation to a field to which the machine learning system is to be applied, may be a metadata set related thereto, or may be any type of dataset that can be learned by the machine learning system.

The data preprocessing unit 120 may perform normalization on the initial dataset input from the data input unit 110 and split the normalized first dataset into a initial training dataset and a initial test dataset. The normalized initial dataset may be split such that 70 to 90% of data is allocated as the initial training dataset and the other 10 to 30% of the data is allocated as the initial test dataset. Preferably, the normalized initial dataset may be split into the initial training dataset and the initial test dataset at a ratio of 8:2.

The learning model generation unit 130 may train the machine learning model using the initial training dataset split and generated by the data preprocessing unit 120, and optimize hyperparameters of the machine learning model using a predetermined number of cross-validations, thereby generating a first learning model. The machine learning model may be any one of a support vector machine (SVM), an XGboost (XGB), and a neural network (NN) method, and preferably the SVM or the XGB model. However, the machine learning model is not limited thereto, and any machine learning model available in scikit-learn or xgboost libraries may be applied. The predetermined number of cross-validations is to improve the accuracy of the generated first learning model and to minimize the overfitting problem, and may be different depending on the prediction accuracy and/or data generation speed to be implemented in the machine learning model. Considering both factors, preferably, the predetermined number of cross-validations may be 8 to 12 cross-validations, and more preferably, 10 cross-validations may be performed. However, the number of cross-validations is not limited thereto, and any number of cross-validations capable of optimizing hyperparameters is allowed.

The validation unit 140 may validate the fitness of the first learning model using the initial test dataset split and generated by the data preprocessing unit 120.

The semi-synthetic data generation unit 150 may select and generate a new parameter within a boundary space defined by the initial dataset, and generate a semi-synthetized dataset by performing data prediction based on the new parameter using the first learning model. The semi-synthetized dataset generated in this way may be updated in the training data pool as new training data. That is, an updated training dataset may be formed by combining with the initial dataset. Here, the "boundary" is acquired from maximum and minimum values of each column of the initial dataset pool. The space for the new parameter selection needs to exist within a boundary condition of a pool defined by the initial dataset, and arbitrarily contaminated data is not introduced.

When the semi-synthetic data generation unit 150 performs data prediction based on the new parameter, a new parameter may be generated using a floating point or integer random number generator to generate a new parameter that may not be acquired from the original initial dataset in order to generate effective training data. In addition, in order to more efficiently generate a new parameter, a parameter calculated based on a boundary condition or a value near the boundary condition may be selected. As described above, the dataset semi-synthetized through the parameter calculated based on the boundary condition or the value near the boundary condition may be training data that can more effectively reflect a characteristic of the corresponding field to which the machine learning system is to be applied.

According to another embodiment of the present invention, instead of combining the generated semi-synthesized dataset with the initial dataset immediately after generation to form an updated training data pool, a filtering process may be additionally performed to remove erroneous predictions so that it is possible to improve the quality of the newly generated training data and improve the predictability of the learning model accordingly. When it is determined that the filtering process is to be performed, the data preprocessing unit 120 combines the semi-synthesized dataset with the initial dataset to generate a second (augmented) dataset, and the second dataset may be split into a second training dataset and a second test dataset again. The split ratio may be the same as or different from that in the split of the initial dataset, and a ratio of the second training dataset to the second test dataset may be 7:3 to 9:1, preferably 8:2.

Thereafter, the learning model generation unit 130 may train the second machine learning model using the second training dataset, and optimize the hyperparameters of the second machine learning model using a predetermined number of cross-validations, thereby further generating a second learning model. The second machine learning model may be any one of a support vector machine (SVM), an XGboost (XGB), and a neural network (NN) method, and preferably the SVM or the XGB model. However, the second machine learning model is not limited thereto, and any machine learning model available in scikit-learn or xgboost libraries may be applied. As the second machine learning model, it is possible to use a model different from the first machine learning model in consideration of characteristics of the field to be applied, processing speed, data prediction accuracy, etc. In the filtering step, the second machine learning model is not used to generate new data, and is simply used as a filter to remove tainted data. Here, "tainted data" is merely defined to evaluate a degree at which the semi-synthesized dataset fits with the existing initial dataset through the second machine learning model, that is, a degree at which a characteristic of the corresponding field is reflected. Therefore, when a validation accuracy is evaluated to be lower than a threshold value of a predetermined accuracy (for example, which may be 80%) at the time of validation through the second machine learning model using the semi-synthesized dataset as the second test dataset, the semi-synthesized dataset becomes a set of tainted data. When the validation accuracy is evaluated to be higher than the threshold value of the accuracy, the semi-synthesized dataset becomes a set of valid data and updated to an input dataset for training.

The validation unit 140 may validate the second machine learning model using the second test dataset to determine whether the validation accuracy of the second learning model is higher than a predetermined validation accuracy threshold value, thereby determining the fitness of the generated new parameter. When the new parameter is determined to be fit, the semi-synthetic data generation unit 150 may identify the semi-synthesized dataset as a valid dataset, and store the second dataset in the database 360 as an updated training dataset. When the new parameter is determined to be unfit, the semi-synthetic data generation unit 150 may determine the semi-synthesized dataset to be a tainted dataset and discard the dataset.

In an embodiment of the present invention, the filtering step on the semi-synthesized dataset is performed through the existing data preprocessing unit 120, the learning model generation unit 130, and the validation unit 140 as described above. However, in another embodiment of the present invention, the data generation apparatus 100 is configured to further include a semi-synthetic data filter unit (not illustrated) so that fitness of the new parameter may be determined based on a second dataset generated by combining a dataset semi-synthesized by the semi-synthetic data filter unit and the initial dataset, and the second machine learning model, and it is possible to determine whether the semi-synthesized data can be accepted as valid data or identified as tainted data and discarded depending on the fitness. In this case, as the second machine learning model, the same model as the first machine learning model may be used, and the first learning model may be used.

The database 160 may store the initial dataset and the semi-synthesized dataset. The database 160 may further store the initial training dataset and the initial test dataset, and may further store intermediate and/or final calculated values calculated in the process of generating semi-synthetic data.

Figure 2:
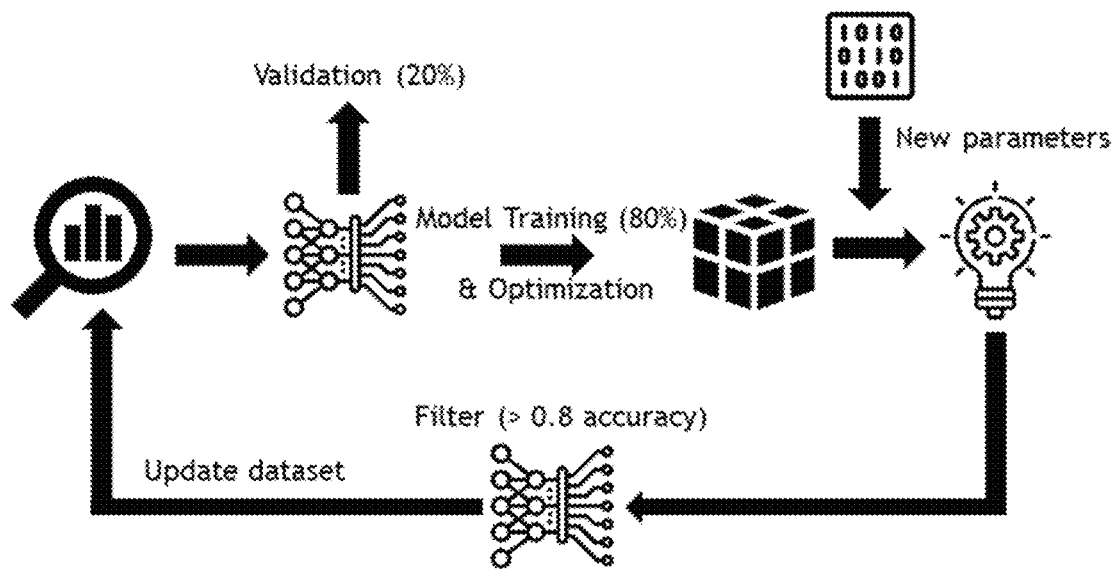
FIG. 2 is a schematic view of a data generation process applied to the semi-synthetic data generation apparatus according to an embodiment of the present invention.

FIG. 2 is a schematic view of a data generation process applied to the semi-synthetic data generation apparatus according to an embodiment of the present invention. In FIG. 2, the filtering process may improve the reliability and quality of the generated training data as an optional step rather than an essential step in a data augmentation process according to an embodiment of the present invention.

Figure 3:
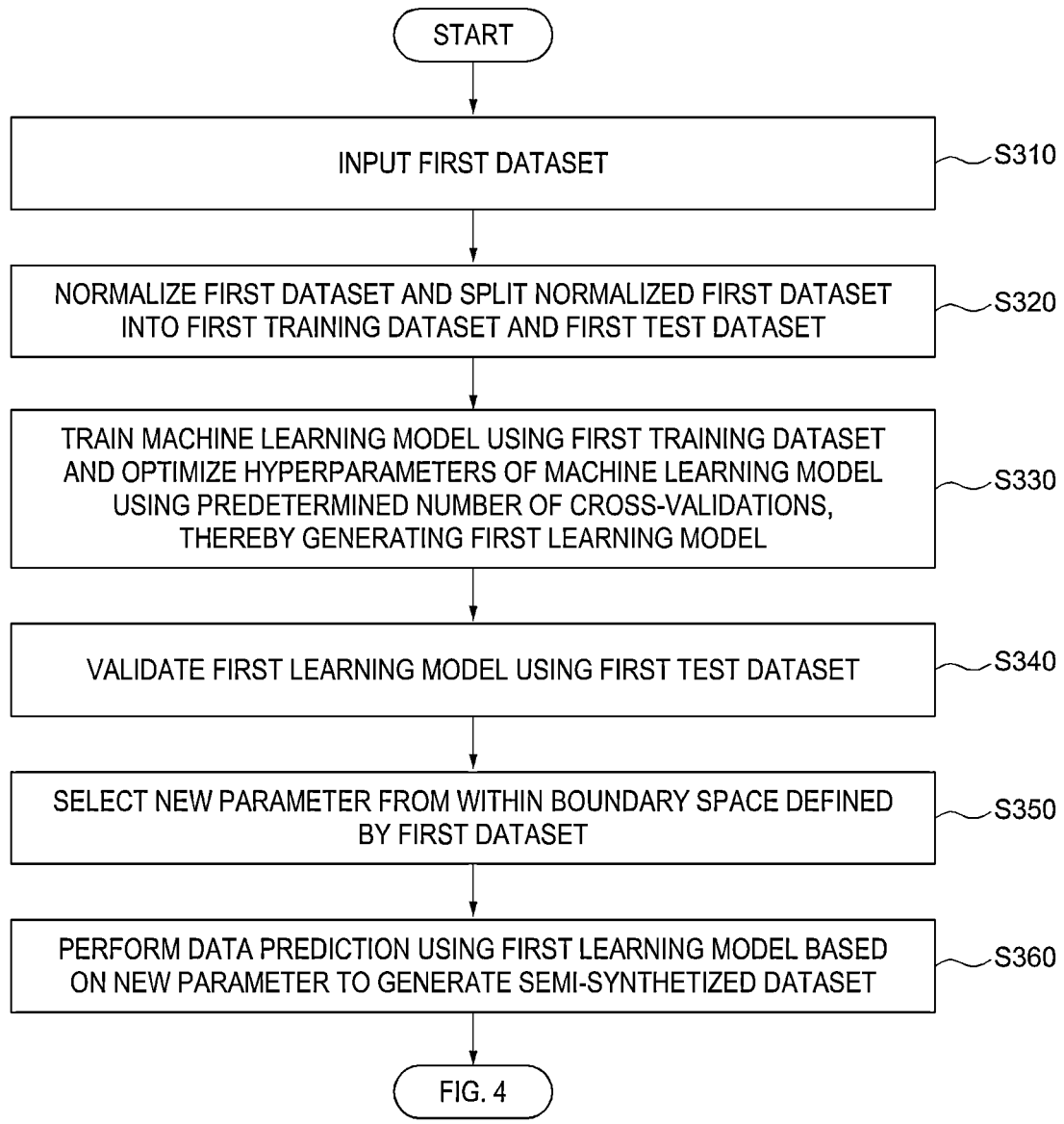
FIG. 3 is a flowchart of a semi-synthetic data generation method according to an embodiment of the present invention.

FIG. 3 is a flowchart of a semi-synthetic data generation method according to an embodiment of the present invention.

Referring to FIG. 3, the semi-synthetic data generation method performed by the data generation apparatus 100 according to the embodiment of the present invention may include a step S310 of first inputting the initial dataset which is previously provided training data in the corresponding field, a step S320 of normalizing the initial dataset and splitting the normalized initial dataset into the initial training dataset and the initial test dataset, a step S330 of training the first machine learning model using the initial training dataset and optimizing the hyperparameters of the first machine learning model using a predetermined number of cross-validations, thereby generating the first learning model, a step S340 of validating the first learning model using the initial test dataset, a step S350 of selecting and generating a new parameter from within the boundary space defined by the initial dataset, and a step S360 of performing data prediction based on the new parameter using the first learning model to generate a semi-synthesized dataset.

Here, the initial dataset may be an existing empirical, arithmetic, or statistical dataset in relation to a field to which the machine learning system is to be applied, may be a metadata set related thereto, or may be any type of dataset that can be learned by the machine learning system. The first machine learning model may be any one of a support vector machine (SVM), an XGboost (XGB), and a neural network (NN) method, and preferably the SVM or the XGB model. However, the first machine learning model is not limited thereto, and any machine learning model available in scikit-learn or xgboost libraries may be applied. The predetermined number of cross-validations is to improve the accuracy of the generated first learning model and to minimize the overfitting problem, and may be different depending on the prediction accuracy and/or data generation speed to be implemented in the first machine learning model. Considering both factors, preferably, the predetermined number of cross-validations may be 8 to 12 cross-validations, and more preferably, 10 cross-validations may be performed. However, the number of cross-validations is not limited thereto, and any number of cross-validations capable of optimizing hyperparameters is allowed.

The semi-synthesized dataset generated in step S360 may be combined with the initial dataset to form an updated training dataset and stored in the database 160. However, according to another embodiment of the present invention, instead of combining the semi-synthesized dataset with the initial dataset immediately after generation to form an updated training data pool, the filtering process may be additionally performed to remove erroneous predictions so that it is possible to improve the quality of the newly generated training data, and improve the predictability of the learning model accordingly.

Figure 4A:
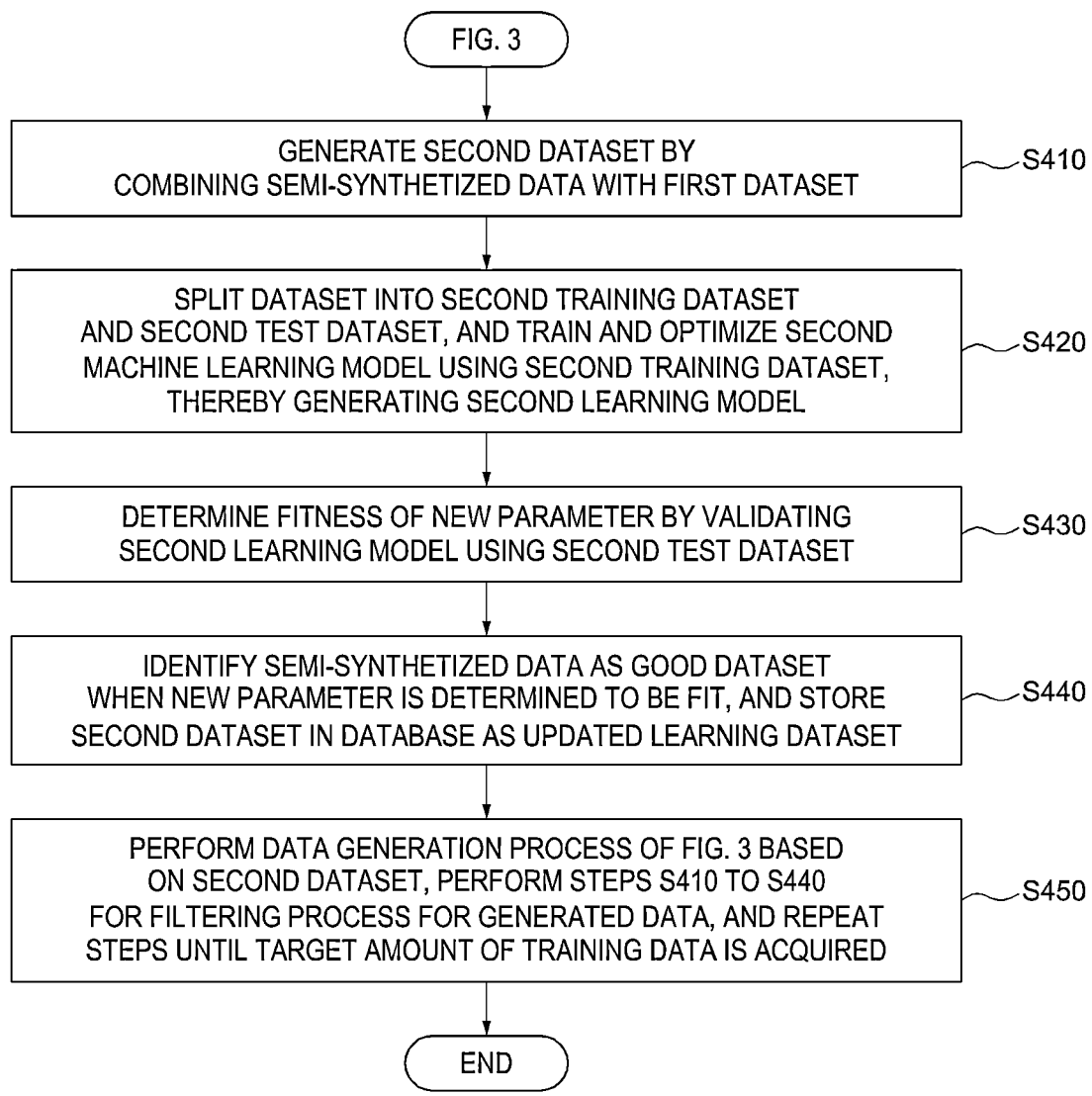
FIGS. 4A and 4B are flowcharts of a data generation method further including a data filtering step to validate reliability of a dataset generated after the data generation method of FIG. 3 according to an embodiment of the present invention.
Figure 4B:
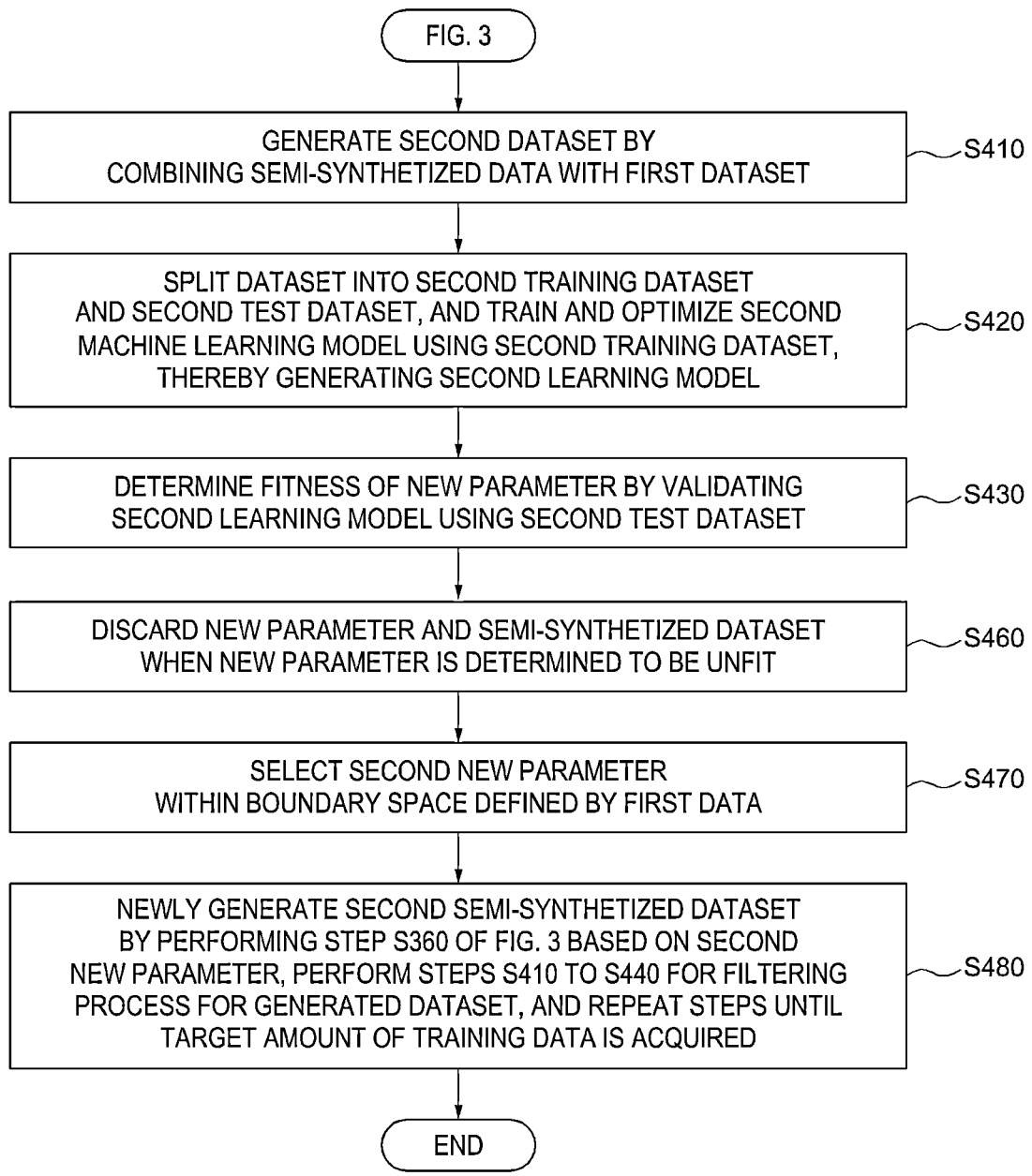

FIGS. 4A and 4B are flowcharts of a data generation method further including a data filtering step to validate reliability of a dataset generated after the data generation method of FIG. 3 according to an embodiment of the present invention. FIG. 4A is a schematic flowchart of the case where it is determined that the new parameter is fit as a result of the filtering process when it is determined to additionally perform such a filtering step, and FIG. 4B is a schematic flowchart of the case where it is determined that the new parameter is unfit as a result of the filtering process.

Referring to FIG. 4A, when it is determined to additionally perform the filtering process in order to improve the reliability of the dataset generated after the data generation method of FIG. 3, the data generation method according to the embodiment of the present invention may further include a step S410 of generating a second dataset by combining the semi-synthetized dataset with the initial dataset, and a step S420 of splitting the second dataset into a second training dataset and a second test dataset and training and optimizing the second machine learning model using the second training dataset, thereby generating a second learning model. The optimization can be performed by optimizing the hyperparameters of the second machine learning model using a predetermined number of cross-validations. The predetermined number of cross-validations may be 8 or 12, and may be preferably 10.

The second machine learning model may be any one of a support vector machine (SVM), an XGboost (XGB), and a neural network (NN) method, and preferably the SVM or the XGB model. However, the second machine learning model is not limited thereto, and any machine learning model available in scikit-learn or xgboost libraries may be applied. As the second machine learning model, it is possible to use the same model as the first machine learning model. As the second machine learning model, it is possible to use a model different from the first machine learning model in consideration of characteristics of the field to be applied, processing speed, data prediction accuracy, etc. In the filtering step, the second machine learning model is not used to generate new data, and is simply used as a filter to remove tainted data.

The data generation method according to the embodiment of the present invention may include a step S430 of determining fitness of the new parameter by validating the second learning model using second test dataset thereafter. In the fitness determination, whether the validation accuracy of the second learning model is higher than a predetermined validation accuracy threshold value may be used to determine the fitness of the new parameter.

The data generation method according to the embodiment of the present invention may further include a step S440 of identifying the semi-synthetized data as a valid dataset when the new parameter is determined to be fit and storing the second dataset in the database 360 as an updated learning dataset, and a step S450 of repeating the steps S310 to S360 of FIG. 3 based on the second dataset and repeatedly performing the steps S410 to 440 when the filtering process is added to the data generated accordingly.

Referring to FIG. 4B, the data generation method according to the embodiment of the present invention may further include a step S460 of discarding the new parameter and the semi-synthetized dataset when the new parameter is determined to be unfit. Further, when the new parameter and the semi-synthetized dataset generated accordingly are discarded, the data generation method may further include a step S470 of selecting and generating by the data generation apparatus 100 a second new parameter within the boundary space defined by the initial data, and a step S480 of newly generating a second semi-synthetized dataset by performing the step S360 of FIG. 3 based on the second new parameter and repeatedly performing the steps S410 to S440 for the filtering process. These steps may be repeated until the data generation apparatus 100 augments and generates a target amount of training data. When the data generation process of FIG. 3 and the data generation and filtering method of FIG. 3, FIG. 4A, and FIG. 4B are repeated to perform data augmentation and then the target amount of training data is acquired, the above data generation process may be terminated.

Figure 5:
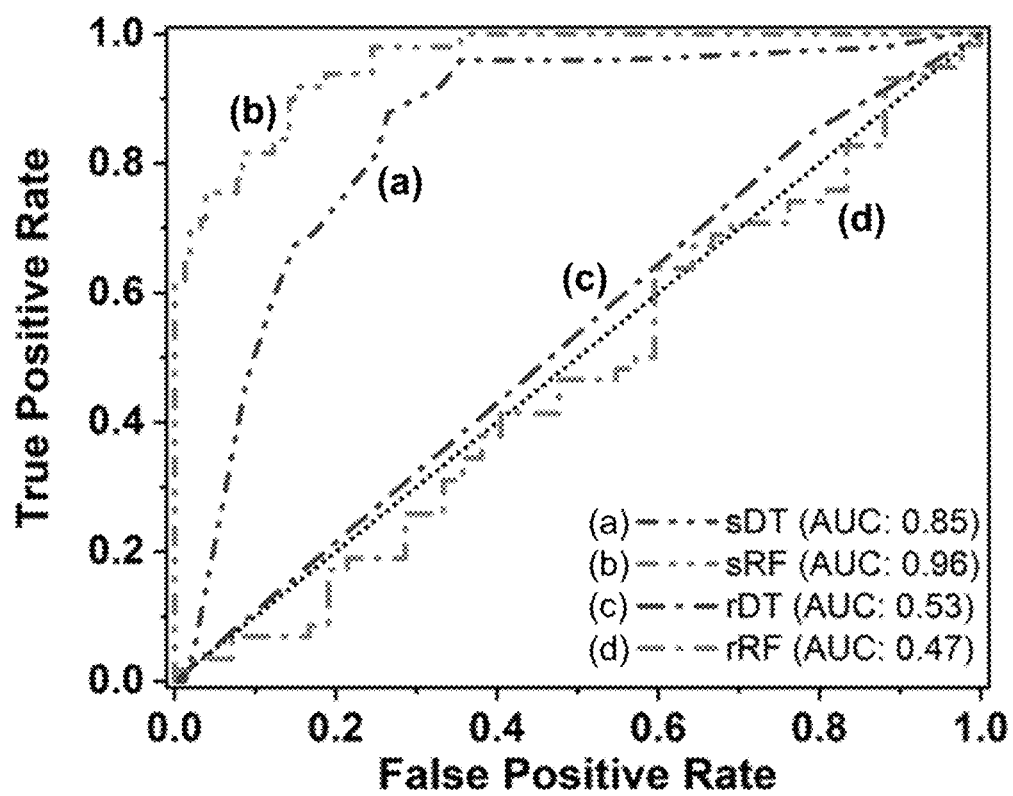
FIG. 5 is a graph illustrating comparison of effective rates between semi-synthetic data generated in FIG. 3 and conventional randomly generated data.

FIG. 5 is a graph illustrating a receiver operating characteristic (ROC) of data generated for the semi-synthetic data generation method according to an embodiment of the present invention of FIG. 3. Here, the receiver operating characteristic (ROC) shows a value of a true positive rate (TP) as a ratio with respect to a value of a false positive rate (FP).

In FIG. 5, each experiment was performed using a decision tree (DT) and a random forest (RF) classifier, and results (rDT, rRF) of experimenting on data randomly generated irrespective of existing training data in Table 1 below using each of the DT and the RF classifier and results (sDT, sRF) of experimenting on data generated by a semi-synthetic method based on existing training data according to an embodiment of the present invention in Table 2 using the DT and the RF classifier are compared and illustrated in on graph. In FIG. 5, an area under the curve (AUC) corresponds to an area under a curve in the precision-recall curve. In Table 1, the precision is expressed as a ratio of a relationship between the true positive rate and the false positive rate. That is, the precision is calculated by a formula TP/(TP+FP), and represents a ratio of how well a correct answer is given among those predicted as positive through the learning model generated according to an embodiment of the present invention. In addition, the recall is calculated by the formula TP/(TP+FP) which is the ratio of the value of the TP (true positive rate) to the FN (false negative rate), and refers to a ratio of how well the real data was found among actual positives through the learning model generated according to an embodiment of the present invention. The F1-score is derived by a formula (2×precision×recall)/(precision+recall) and represents a harmonic average of precision and recall. The F1-score is an index that evaluates how well the positive is predicted, considering both precision and recall.

TABLE 1

| Random data (r) | Decision tree (sDT) | | Random forest (sRF) | |
|---|---|---|---|---|
| Label | 0 | 1 | 0 | 1 |
| Precision | 0.46 | 0.6 | 0.4 | 0.55 |
| Recall | 0.31 | 0.74 | 0.64 | 0.31 |
| F1-score | 0.37 | 0.66 | 0.5 | 0.4 |

<Results of Receiver Operating Characteristics for Randomly Generated Dataset>

TABLE 2

| Semi-synthetic data (s) | Decision tree (sDT) | | Random forest (sRF) | |
|---|---|---|---|---|
| Label | 0 | 1 | 0 | 1 |
| Precision | 0.89 | 0.59 | 0.92 | 0.86 |

TABLE 2-continued

| Semi-synthetic data (s) | Decision tree (sDT) | | Random forest (sRF) | |
|---|---|---|---|---|
| Recall | 0.85 | 0.67 | 0.96 | 0.73 |
| F1-score | 0.87 | 0.63 | 0.94 | 0.79 |

<Results of Receiver Operating Characteristics for Semi-Synthetic Dataset>

As can be seen in Table 1 and FIG. 5, the randomly generated dataset has the receiver operating characteristic values, that is, precision, recall, and F1-score values near 0.5 when the DT or the RF classifier is applied (rDT, rRF). On the other hand, in Table 2 and FIG. 5, it can be found that the dataset generated by the semi-synthetic method based on the previously provided training data (initial data) has significantly improved in receiver operating characteristics with a maximum precision of 0.92, a maximum recall of 0.96, and a maximum F1-score of 0.94 when the DT or the RF classifier is applied (sDT, sRF). Therefore, according to the semi-synthetic data generation method according to the embodiment of the present invention of FIG. 3, a large amount of data with significantly higher reliability than that of the data according to the conventional data augmentation method can be generated through a relatively simple and rapid data augmentation process. For reference, in Tables 1 and 2, the decision tree (DT) method and the random forest (RF) are different models from each other. Further, unlike the randomly generated data in Table 1, the characteristic values at 1 are generally higher than the values at 0 in the receiver operating characteristics for the synthetic dataset according to the embodiment of the present invention of Table 2 since the original training dataset (the first dataset) initially provided for data generation has asymmetry, that is, since the number of pieces of data corresponding to 0 is greater than the number of pieces of data corresponding to 1, and thus reliability is higher at 0 than at 1.

Therefore, the present invention can be variously applied to the case where the machine learning system needs to predict various analyses and answers based on a few training datasets. For example, the present invention can be applied to language fields, chatbot fields, image recognition fields, etc. where errors frequently occur when based on a small dataset. In addition, the reliability of the machine learning system can be improved when the present invention is applied to various analysis and/or prediction machine learning techniques when the number of pieces of sample data underlying within a certain boundary is small, such as 'analysis of binge drinking behavior of KAIST students' in the analysis.

Figure 6:
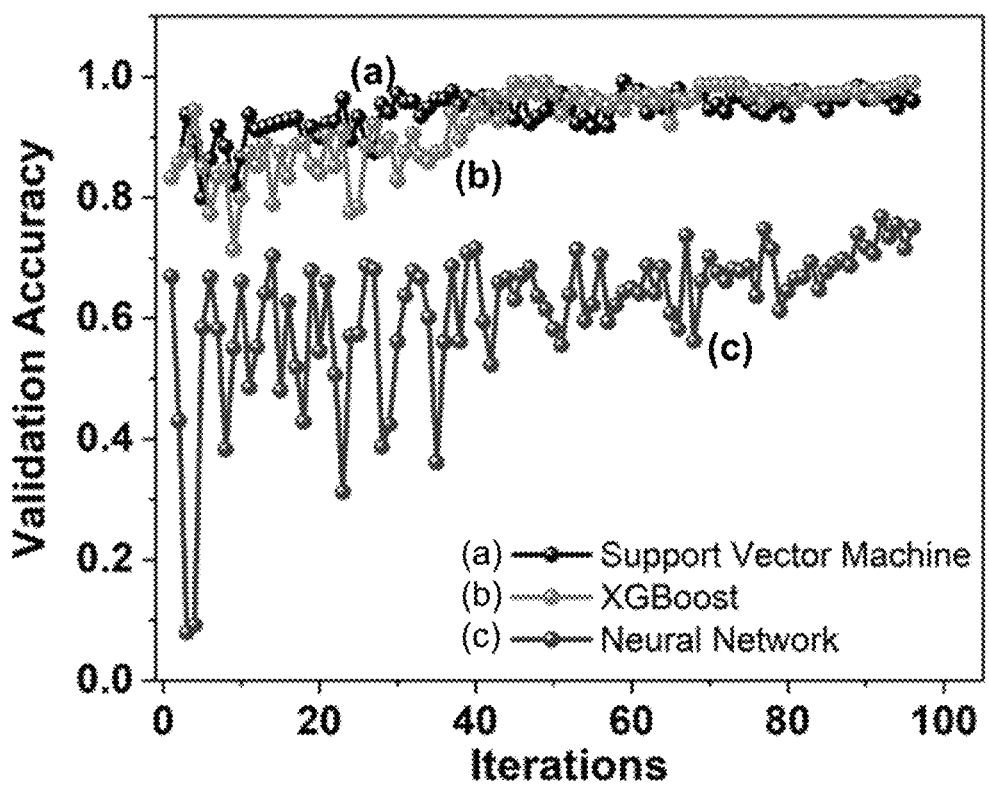
FIG. 6 is a graph illustrating results of validation accuracy and data generation speed according to different machine learning methods when a filtering process is not applied as in the data generation method of FIG. 3.

FIG. 6 is a graph indicating an experiment result for validation accuracy and speed (iterations) according to different machine learning methods in the case of simply generating semi-synthetic data without applying a filtering step as in the data generation method according to the embodiment of the present invention of FIG. 3, and shows which machine learning model shows the best performance when no filter is applied. In this experiment, Support Vector Machine (SVM), XGboost (XGB), and Neural Network (NN) were selected as examples as machine learning models, and the performance was compared using the same training dataset.

In FIG. 6, in the case of the NN model, the time interval between cycles (iterations) was relatively larger than that of the SVM model or the XGB model, resulting in a slower data generation speed and lower performance in the validation accuracy value. In the case of the XGB model, it can be seen that the SVM model or the XGB model can be used as a machine learning model for data generation when only the validation accuracy factor is considered since the XGB model shows similar performance to that of the SVM model in validation accuracy. However, when the user prioritizes not only validation accuracy but also other factors, especially data generation speed, it may be desirable to select the SVM model as the machine learning model in that case as the hyperparameter optimization time of the XGB model is much longer than that of the SVM model.

Figure 7:
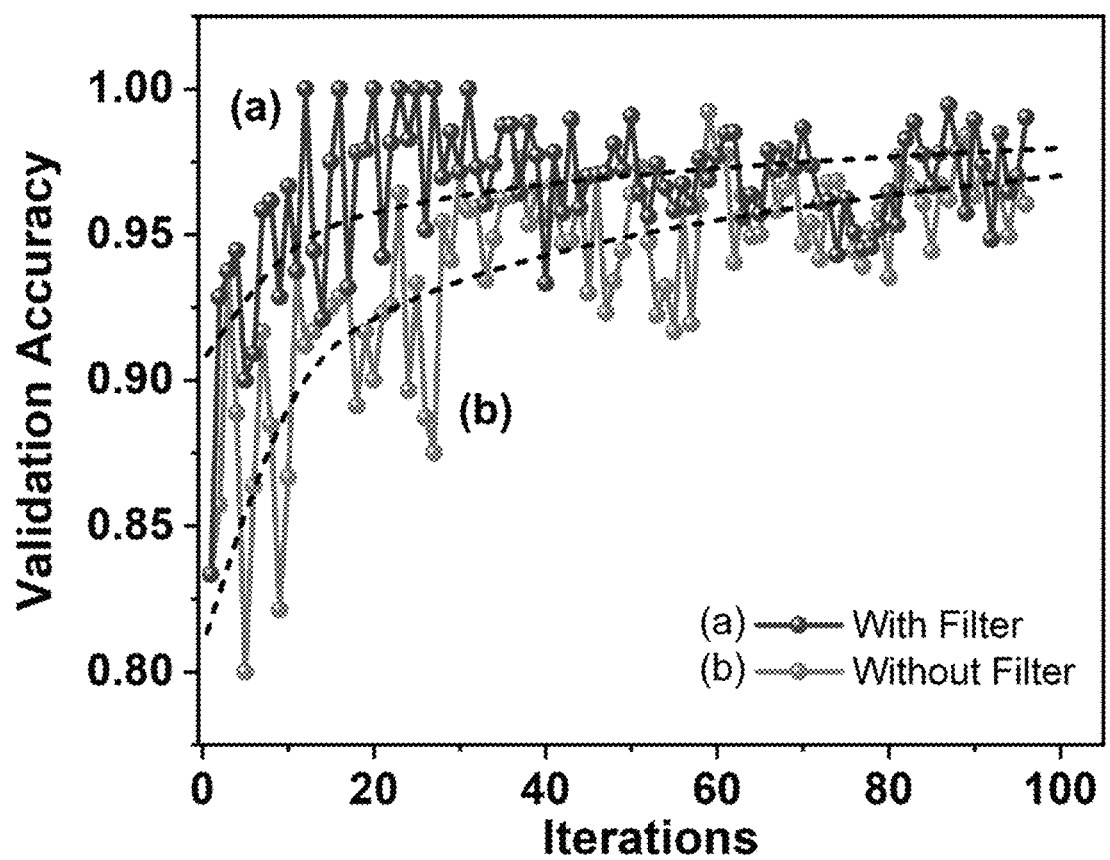
FIG. 7 is a graph illustrating validation accuracy and processing speed results according to different machine learning methods when a data filtering process as in FIGS. 4A and 4B is added after the data generation method of FIG. 3.

FIG. 7 illustrates a graph indicating an experiment result for the validation accuracy and the data generation speed by comparing the case where only the data generation method according to the embodiment of the present invention of FIG. 3 is performed (without filter) with the case where the filtering step illustrated in FIG. 4A and/or FIG. 4B is additionally performed to select a well-predicted new parameter after performing such a data generation method. In the experiment of FIG. 7, the SVM model was used for both the first machine learning model for generating semi-synthetized data and the second machine learning model for the data filtering step. Additional performance analysis can be performed using the high-quality training dataset augmented and generated in this way. In this case, there is an imbalance in the amount of training data in the performance analysis of the machine learning model compared to before data augmentation, so the data imbalance can be solved using a synthetic minority over-sampling technique to quantitatively balance the dataset.

FIG. 7 illustrates that overall validation accuracy is higher when the filtering step is additionally performed than when only the data generation method is performed. As can be seen in FIG. 7, when the filtering step is not applied, all new predicted parameters are updated to the training dataset, and a possibility that the generated data is updated to the training dataset based on an erroneously predicted parameter may not be ruled out. Therefore, in such a case, the predictability of machine learning is degraded. On the other hand, when the filtering step is additionally applied, it is confirmed that the overall quality of the dataset generated in FIG. 7 as training data is greatly improved since it is possible to exclude the erroneously predicted dataset by performing the filtering step, and the problem of bias or error of the machine learning system trained based on such data can be solved, so that the prediction accuracy can be improved. Therefore, when the filtering step is applied as in FIGS. 4A and 4B after generating semi-synthetic data, it is possible to exclude impure data or tainted data with faster speed and higher reliability during data synthesis. Thus, the prediction accuracy of the machine learning system is improved.

Thus, according to the present invention, by including metadata learning for preventing meaningless parameter integration that can lead to errors by contaminating the data generation process in the future, evaluation of machine learning models, creation of new parameters through flexible boundary condition setting, and automatic filtering system, it is possible to provide a relatively high-speed and highly reliable data synthesis system when compared to a machine learning technique that analyzes/predicts/reacts by randomly extracting or integrating random data.

The embodiments described above may be implemented by a hardware component, a software component, and/or a combination of a hardware component and a software component. For example, the system, the apparatus, the method, and the components described in the embodiments may be implemented using one or more general-purpose computers or special-purpose computers such as a processor, a controller, a central processing unit (CPU), a graphics processing unit (GPU), an arithmetic logic unit (ALU), a digital signal processor, a microcomputer, a field programmable gate array (FPGA), a programmable logic unit (PLU), a microprocessor, application specific integrated circuits (ASICS), a server, or any other device capable of executing and responding to instructions.

The data generation method according to the embodiment of the present invention may be implemented in the form of program instructions that can be executed through various computer means and recorded in a computer-readable medium. The computer-readable medium may include program instructions, data files, data structures, etc. alone or in combination. The program instructions recorded on the medium may be specially designed and configured for the embodiment, or may be known and available to those skilled in the art of computer software. The hardware device may be configured to operate as one or more software modules to perform the operations of the embodiments, and vice versa.

According to the present invention, it is possible to generate a large amount of data with high reliability compared to data according to a conventional data augmentation method through a relatively simple and rapid data augmentation process.

The present invention can be variously applied to the case where the machine learning system needs to predict various analyses and answers based on a few training datasets. For example, the present invention can be applied to language fields, chatbot fields, image recognition fields, etc. where errors frequently occur when based on a small dataset. In addition, the reliability of the machine learning system can be improved when the present invention is applied to various analysis and/or prediction machine learning techniques when the number of pieces of sample data underlying within a certain boundary is small.

According to the present invention, when data synthesis is performed, it becomes possible to exclude impure data or tainted data with faster speed and higher reliability, thereby improving the prediction accuracy of the machine learning system.

As a result, according to the present invention, by including metadata learning for preventing meaningless parameter integration that can lead to errors by contaminating the data generation process in the future, evaluation of machine learning models, creation of new parameters through flexible boundary condition setting, and automatic filtering system, it is possible to provide a relatively high-speed and highly reliable data synthesis system when compared to a machine learning technique that analyzes/predicts/reacts by randomly extracting or integrating random data.

Even though the embodiments have been described with reference to the limited drawings as described above, various modifications and variations are possible from the above description by those of ordinary skill in the art. For example, an appropriate result may be achieved even when the described techniques are performed in a different order from that in the described method, and/or when the described components of the system, structure, apparatus, circuit, etc. are united or combined in a different form from that in the described method or replaced or substituted by other components or equivalents.

The scope of the present invention is indicated by the following claims, and all changes or modifications derived from the meaning and scope of the claims and equivalents thereof should be construed as being included in the scope of the present invention.

What is claimed is:

1. A data generation apparatus comprising:
a data input unit configured to input an initial dataset;
a data preprocessing unit configured to normalize the initial dataset and generate a normalized initial dataset, and split the normalized initial dataset into an initial training dataset and an initial test dataset;
a learning model generation unit configured to train a first machine learning model using the initial training dataset, and optimize a hyperparameter of the first machine learning model using a predetermined number of cross-validations, thereby generating a first learning model;
a validation unit configured to validate the first learning model using the initial test dataset;
a semi-synthetic data generation unit configured to select and generate a new parameter within a boundary space defined by the initial dataset, and perform data prediction using the first learning model based on the new parameter to generate a semi-synthetized dataset; and
a database configured to store the initial dataset and the semi-synthetized dataset,
wherein the data preprocessing unit is further configured to combine the semi-synthetized dataset with the initial dataset to generate a second dataset and to split the second dataset into a second training dataset and a second test dataset,
wherein the learning model generation unit is further configured to train a second machine learning model using the second training dataset and to optimize a hyperparameter of the second machine learning model using a second predetermined number of cross-validations, thereby further generating a second learning model,
wherein the validation unit is further configured to validate the second learning model using the second test dataset, and
wherein, when the new parameter is determined to be unfit, the semi-synthetic data generation unit is further configured to discard the semi-synthetized dataset, to select and generate a second new parameter within the boundary space defined by the initial dataset, and to generate a second semi-synthetized dataset based on the second new parameter.

2. The data generation apparatus according to claim 1, wherein the validation unit validates the second machine learning model using the second test dataset to determine whether a validation accuracy of the second learning model is higher than a predetermined validation accuracy threshold value, thereby determining a fitness of the new parameter.

3. The data generation apparatus according to claim 2, wherein when the new parameter is determined to be fit, the semi-synthetic data generation unit identifies the semi-synthetized dataset as a valid dataset and stores the second dataset in the database.

4. The data generation apparatus according to claim 1, wherein the semi-synthetic data generation unit generates the new parameter using a floating point or integer random number generator to generate a parameter unobtainable from the initial dataset when the new parameter is selected.

5. The data generation apparatus according to claim 1, wherein the semi-synthetic data generation unit selects and generates the new parameter calculated based on a boundary condition of the boundary space defined by the initial dataset when the new parameter is selected.

6. The data generation apparatus according to claim 1, wherein the first machine learning model uses a support vector machine (SVM) or an XGboost (XGB).

7. A data generation method performed by a data generation apparatus, the data generation method comprising:
(a) inputting an initial dataset;
(b) normalizing the initial dataset to generate a normalized initial dataset and splitting the normalized initial dataset into an initial training dataset and an initial test dataset;
(c) training a first machine learning model using the initial training dataset and optimizing a hyperparameter of the first machine learning model using a predetermined number of cross-validations, thereby generating a first learning model;
(d) validating the first learning model using the initial test dataset;
(e) selecting and generating a new parameter from within a boundary space defined by the initial dataset;
(f) performing a data prediction based on the new parameter using the first learning model to generate a semi-synthetized dataset;
(g) generating a second dataset by combining the semi-synthetized dataset with the initial dataset;
(h) splitting the second dataset into a second training dataset and a second test dataset and training and optimizing a second machine learning model using the second training dataset, thereby generating a second learning model;
(i) determining a fitness of the new parameter by validating the second learning model using the second test dataset;
(j) identifying the semi-synthetized dataset as a good dataset when the new parameter is determined to be fit; and
(k) discarding the new parameter and the semi-synthetized dataset when the new parameter is determined to be unfit, selecting a second new parameter within the boundary space defined by the initial dataset, generating a second semi-synthetized dataset by performing step (f) using the second new parameter instead of the new parameter and repeatedly performing steps (g) through (k) using the second semi-synthetized dataset as the semi-synthetized dataset until a target amount of good datasets is obtained.

8. A data generation method performed by a data generation apparatus, the data generation method comprising:
inputting an initial dataset;
normalizing the initial dataset to generate a normalized initial dataset and splitting the normalized initial dataset into an initial training dataset and an initial test dataset;
training a first machine learning model using the initial training dataset and optimizing a hyperparameter of the first machine learning model using a predetermined number of cross-validations, thereby generating a first learning model;
validating the first learning model using the initial test dataset;
selecting and generating a new parameter from within a boundary space defined by the initial dataset; and
performing a data prediction based on the new parameter using the first learning model to generate a semi-synthetized dataset,
wherein the semi-synthetized dataset is combined with the initial dataset to generate a second dataset, and splits the second dataset into a second training dataset and a second test dataset,
wherein a second machine learning model is trained using the second training dataset and optimizes a hyperparameter of the second machine learning model using a second predetermined number of cross-validations, thereby further generating a second learning model,
wherein the second learning model is validated using the second test dataset, and
wherein, when the new parameter is determined to be unfit, the semi-synthetized dataset is discarded, a second new parameter is selected and generated within the boundary space defined by the initial dataset, and a second semi-synthetized dataset is generated based on the second new parameter.

9. The data generation method according to claim 8, further comprising:
validating the second machine learning model using the second test dataset to determine whether a validation accuracy of the second learning model is higher than a predetermined validation accuracy threshold value, thereby determining a fitness of the new parameter.

10. The data generation method according to claim 9, further comprising
identifying the semi-synthetized dataset as a valid dataset and storing the second dataset in a database when the new parameter is determined to be fit.

11. The data generation method according to claim 8, wherein the selecting and generating the new parameter includes generating the new parameter using a floating point or integer random number generator to generate a parameter not allowed to be acquired from the initial dataset.

12. The data generation method according to claim 8, wherein the selecting and generating the new parameter includes selecting and generating the new parameter calculated based on a boundary condition of the boundary space defined by the initial dataset.

13. The data generation method according to claim 8, wherein the first machine learning model uses a support vector machine (SVM) or an XGboost (XGB).

14. The data generation method according to claim 8, wherein the second machine learning model is different than that of the first machine learning model.

15. The data generation method according to claim 8, further comprising filtering the semi-synthetized dataset by determining a fitness of the new parameter based on the second dataset and the first machine learning model,
wherein the filtering the semi-synthetized dataset includes:
identifying the semi-synthetized dataset as a valid dataset and storing the semi-synthetized dataset in a database when the new parameter is determined to be fit, and
discarding the semi-synthetized dataset when the new parameter is determined to be unfit.

* * * * *